United States Patent
Pistilli et al.

(10) Patent No.: US 12,038,058 B2
(45) Date of Patent: Jul. 16, 2024

(54) BUSHING

(71) Applicant: Lear Corporation, Southfield, MI (US)

(72) Inventors: Gregory Pistilli, Freising (DE); Florian Gerbl, Berglern (DE); Alexej Niederhaus, Welden (DE); Mathias Busch, Freising (DE); Tino Schneider, Isen (DE); Rajdeep Rajput, Freising (DE); Michael Schuhbauer, Schweitenkirchen (DE); Arunkumar Boda, Ingolstadt (DE)

(73) Assignee: LEAR CORPORATION, Southfield, MI (US)

( * ) Notice: Subject to any disclaimer, the term of this patent is extended or adjusted under 35 U.S.C. 154(b) by 845 days.

(21) Appl. No.: 17/021,580

(22) Filed: Sep. 15, 2020

(65) Prior Publication Data
US 2021/0095735 A1   Apr. 1, 2021

(30) Foreign Application Priority Data

Sep. 30, 2019   (DE) .......................... 102019215064.0

(51) Int. Cl.
*F16F 1/373* (2006.01)
*B60N 2/30* (2006.01)
*B60N 2/90* (2018.01)

(52) U.S. Cl.
CPC .............. *F16F 1/3732* (2013.01); *B60N 2/90* (2018.02)

(58) Field of Classification Search
CPC ........... F16F 1/3732; B60N 2/90; B60N 2/22; B60N 2/3013
See application file for complete search history.

(56) References Cited

U.S. PATENT DOCUMENTS

| | | | |
|---|---|---|---|
| 2,351,698 A | 6/1944 | Nystrom | |
| 2,675,283 A | 4/1954 | Thomson | |
| 4,179,038 A | 12/1979 | Rosán, Jr. | |
| 6,080,982 A | 6/2000 | Cohen | |
| 6,305,748 B1 | 10/2001 | Ohba | |
| 7,581,793 B2 * | 9/2009 | Hartmann | B60N 2/3013 297/331 |
| 9,194,454 B2 | 11/2015 | Okimura et al. | |
| 9,630,529 B2 | 4/2017 | Higashi et al. | |
| 10,076,977 B2 | 9/2018 | Falchero et al. | |
| 10,711,837 B2 * | 7/2020 | Greinwald | B60N 2/0722 |

(Continued)

FOREIGN PATENT DOCUMENTS

| | | |
|---|---|---|
| CN | 203641255 U | 6/2014 |
| CN | 105026205 A | 11/2015 |

(Continued)

OTHER PUBLICATIONS

German Office Action dated Nov. 17, 2020 for German Patent Appln. No. DE102019009183.3; 7 pages.

(Continued)

*Primary Examiner* — Thomas W Irvin
(74) *Attorney, Agent, or Firm* — Brooks Kushman P.C.

(57) ABSTRACT

A bushing having a bearing wall that extends partially around an axis. The bearing wall may include a first end surface, a second end surface, and an inner side that may extend from the first end surface to the second end surface. The inner side may define the bushing opening having an elliptical configuration.

20 Claims, 9 Drawing Sheets

(56) References Cited

U.S. PATENT DOCUMENTS

| | | |
|---|---|---|
| 10,787,097 B2 | 9/2020 | Bodke et al. |
| 2002/0079730 A1 | 6/2002 | Schuhmacher et al. |
| 2004/0200926 A1 | 10/2004 | Wodak et al. |
| 2008/0284224 A1 | 11/2008 | Hartmann et al. |
| 2011/0204691 A1 | 8/2011 | Schuhmacher et al. |
| 2013/0328342 A1* | 12/2013 | Okimura ............... B60N 2/22 297/354.12 |
| 2015/0266398 A1* | 9/2015 | Higashi ............. B60N 2/2356 297/367 R |
| 2015/0375788 A1* | 12/2015 | Yun ................... F16F 1/3842 267/292 |
| 2016/0185261 A1 | 6/2016 | Hammann et al. |
| 2018/0149194 A1* | 5/2018 | Greinwald .......... B60N 2/0717 |
| 2019/0016239 A1* | 1/2019 | Vogt .................. B60N 2/366 |
| 2019/0344686 A1 | 11/2019 | Kavanagh et al. |
| 2020/0171978 A1* | 6/2020 | Bodke ............... B60N 2/01558 |

FOREIGN PATENT DOCUMENTS

| | | |
|---|---|---|
| CN | 208164817 U | 11/2018 |
| DE | 20111471 U1 | 10/2001 |
| DE | 102007030427 | 7/2008 |
| FR | 2663889 A1 | 1/1992 |
| JP | 2016168942 A | 9/2016 |

OTHER PUBLICATIONS

Chinese Office Action dated Jul. 5, 2022 for Chinese Patent Appln. No. 202011047349.2; 6 pages.

Chinese Office Action dated Jun. 30, 2022 for Chinese Patent Appln. No. 202011048639.9; 8 pages.

German Office Action dated Sep. 14, 2020 for German Patent Appln. No. DE102019215064.0; 10 pages.

* cited by examiner

BUSHING

TECHNICAL FIELD

This disclosure relates to a bushing that may have a bushing opening that may have an elliptical configuration.

BACKGROUND

A seat assembly having a pivot mechanism and a bushing is disclosed in U.S. Pat. No. 10,207,604.

SUMMARY

In at least one configuration, a bushing is provided. The bushing may include a bearing wall. The bearing wall may extend partially around an axis and may include a first end surface, a second end surface, and an inner side. The second end surface may be disposed opposite the first end surface and may be spaced apart from the first end surface. The inner side may face toward the axis, may extend from the first end surface to the second end surface, and may define a bushing opening having an elliptical configuration.

In at least one configuration, a bushing is provided. The bushing may include a bearing wall, a first wall, and a second wall. The bearing wall may extend partially around an axis and may include a first end surface, a second end surface, an inner side, and an outer side. The second end surface may be disposed opposite the first end surface and may be spaced apart from the first end surface. The inner side may face toward the axis, may extend from the first end surface to the second end surface, and may define a bushing opening having an elliptical configuration. The outer side may be disposed opposite the inner side. The first wall and the second wall may extend away from the axis and may extend from the bearing wall.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
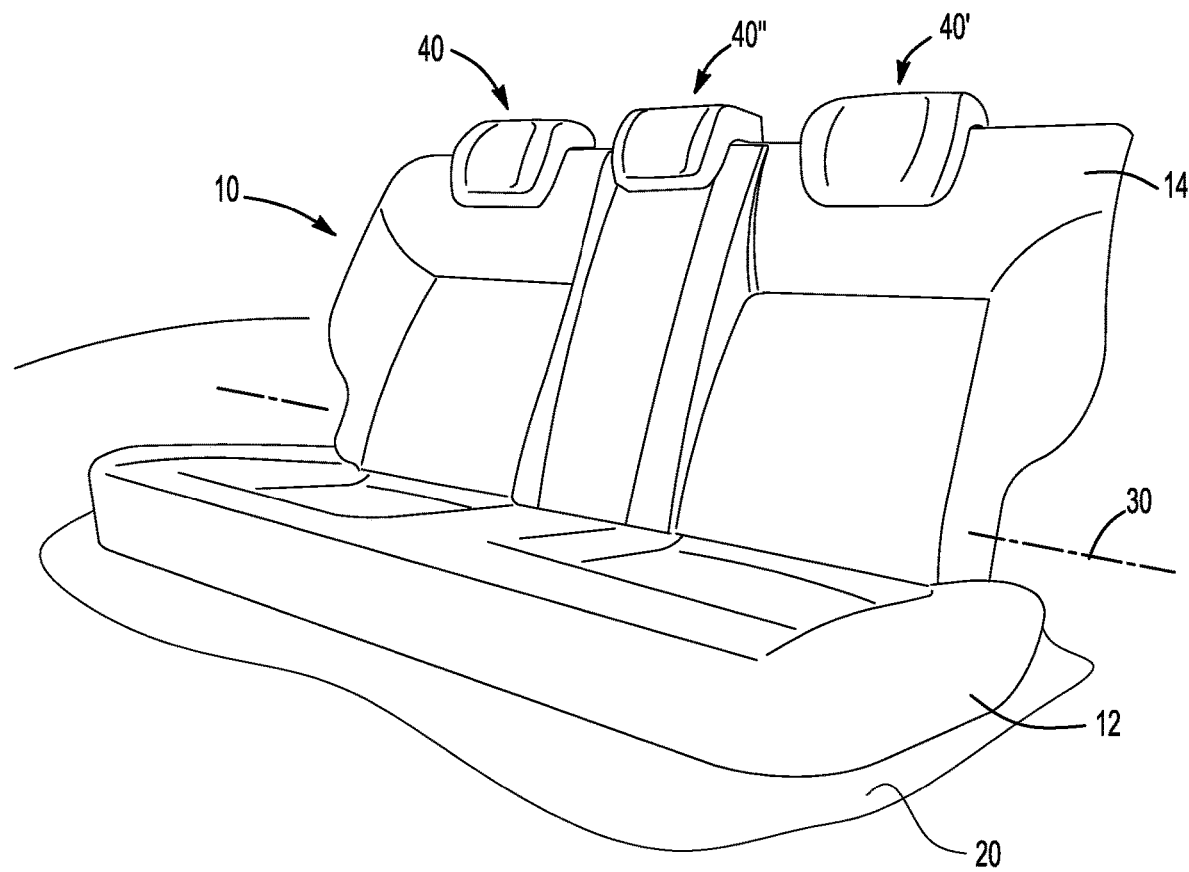
FIG. 1 is a perspective view of an example of a seat assembly.

Referring to FIG. 1, an example of a seat assembly 10 is shown. The seat assembly 10 may be provided with a vehicle, such as a motor vehicle like a car or truck. The seat assembly 10 may be configured as a rear seat that may be positioned behind a front seating row or front seat that may be occupied by a vehicle driver. The seat assembly 10 may include a seat bottom 12 and a seat back 14. As is best shown in FIG. 2, at least one mounting bracket assembly 16 and at least one end mounting bracket assembly 18 may facilitate mounting of the seat assembly 10.

Referring to FIG. 1, the seat bottom 12 may be configured to be mounted on a support structure 20, such as a floor pan of a vehicle. The seat bottom 12 may be configured to support a seat occupant.

The seat back 14 may be disposed proximate the seat bottom 12 and may be configured to support the back of a seat occupant. The seat back 14 or a portion thereof may be rotatable about an axis 30 with respect to the seat bottom 12 and the support structure 20. The axis 30 may extend in a generally horizontal direction. As is best shown in FIG. 2, the seat back 14 may include a seat back frame 32, at least one pivot pin 34, and at least one secondary pin 36.

Figure 2:
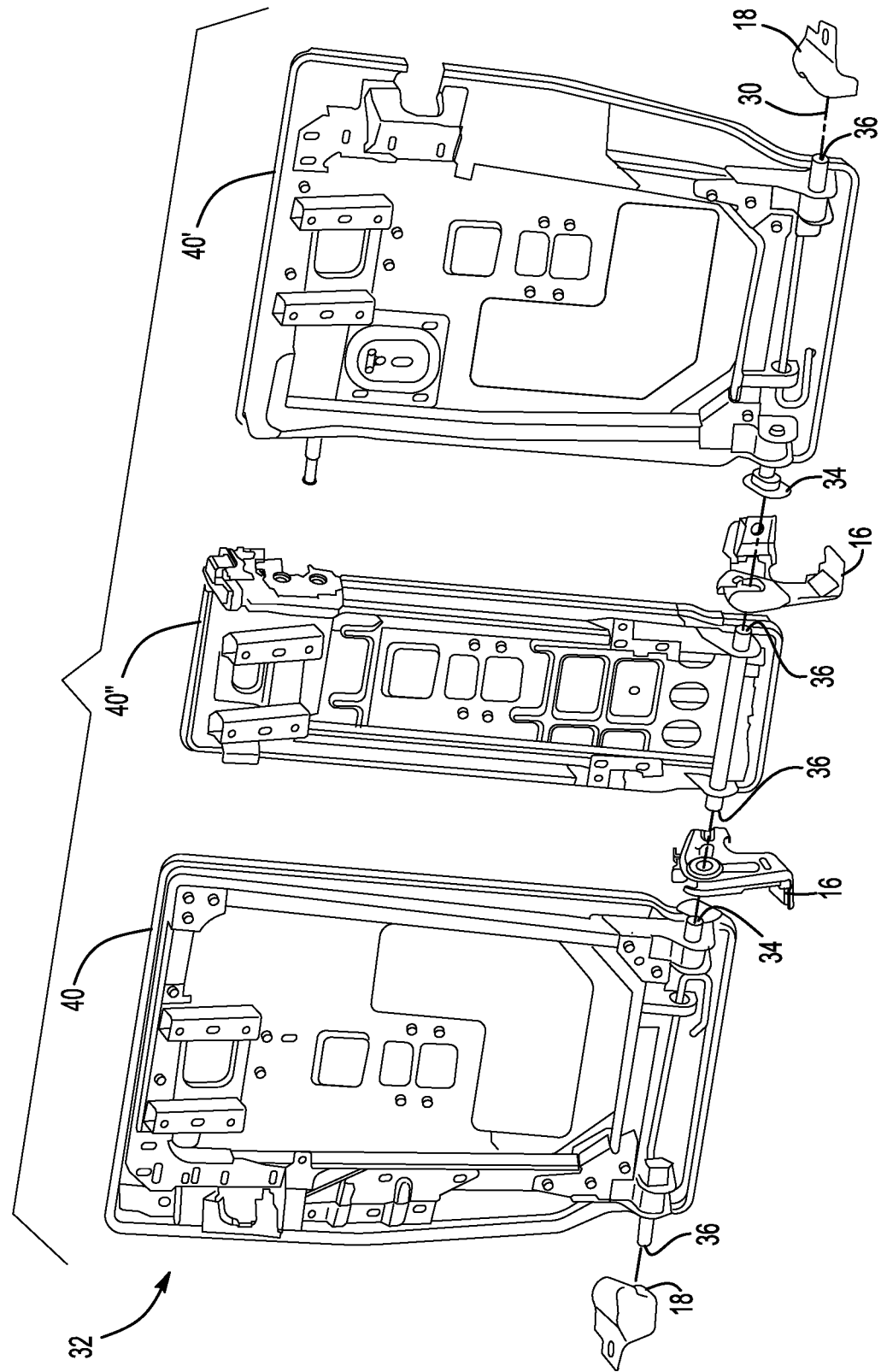
FIG. 2 is an exploded view of a seat back frame of the seat assembly.

Referring to FIG. 2, the seat back 14 is shown without a trim cover and seat cushions to more clearly illustrate the seat back frame 32. The seat back frame 32 may have one or more seat back portions that may be rotatable about the axis 30 from a generally upright seating position shown in FIG. 1 to a folded position in which at least a portion of the seat back 14 and the seat back frame 32 may be folded over the top of the seat bottom 12. The seating position may be a nominal seating position or normal use position that may allow a person to occupy the seat assembly 10. As such, the seat back 14 may be reclined or angled slightly backward from vertical when in the seating position. A portion of the seat back 14 may contact the seat bottom 12 and/or may extend in a generally horizontal direction when in the folded position.

In the configuration shown in FIG. 2, the seat back frame 32, and hence the seat back 14, is depicted as being split into three portions that may pivot about the axis 30. For clarity in reference, the portions are numbered from left to right with reference numbers 40, 40", and 40'. The portions 40, 40', 40" may extend laterally across the vehicle or across the width of the seat back 14. The portions 40, 40', 40" may or may not have substantially the same sizes. For example, the seat back 14 in FIG. 1 is provided with a 40/20/40 split configuration in which portions 40 and 40' have approximately equal widths that each extend across the approximately 40% of the seat back 14 while portion 40" extends across approximately 20% of the seat back 14. It is also contemplated that the seat back frame 32 may have fewer than three portions. For example, the seat back frame 32 may be split into two portions that may have equal or unequal widths. It is also contemplated that the seat back frame 32 may not be split.

The pivot pin 34 may be fixed to the seat back frame 32. For example, a pivot pin 34 may be fixedly coupled to a portion of the seat back frame 32, such as portions 40 and 40'. A pivot pin 34 may extend along the axis 30 and may be rotatable about the axis 30. In at least one configuration like that shown in FIG. 4, the pivot pin 34 may include a shaft 50, an enlarged head 52, a first protrusion 54, and a second protrusion 56. The pivot pin 34 may also include a first flat surface 60 and a second flat surface 62.

Figure 3:
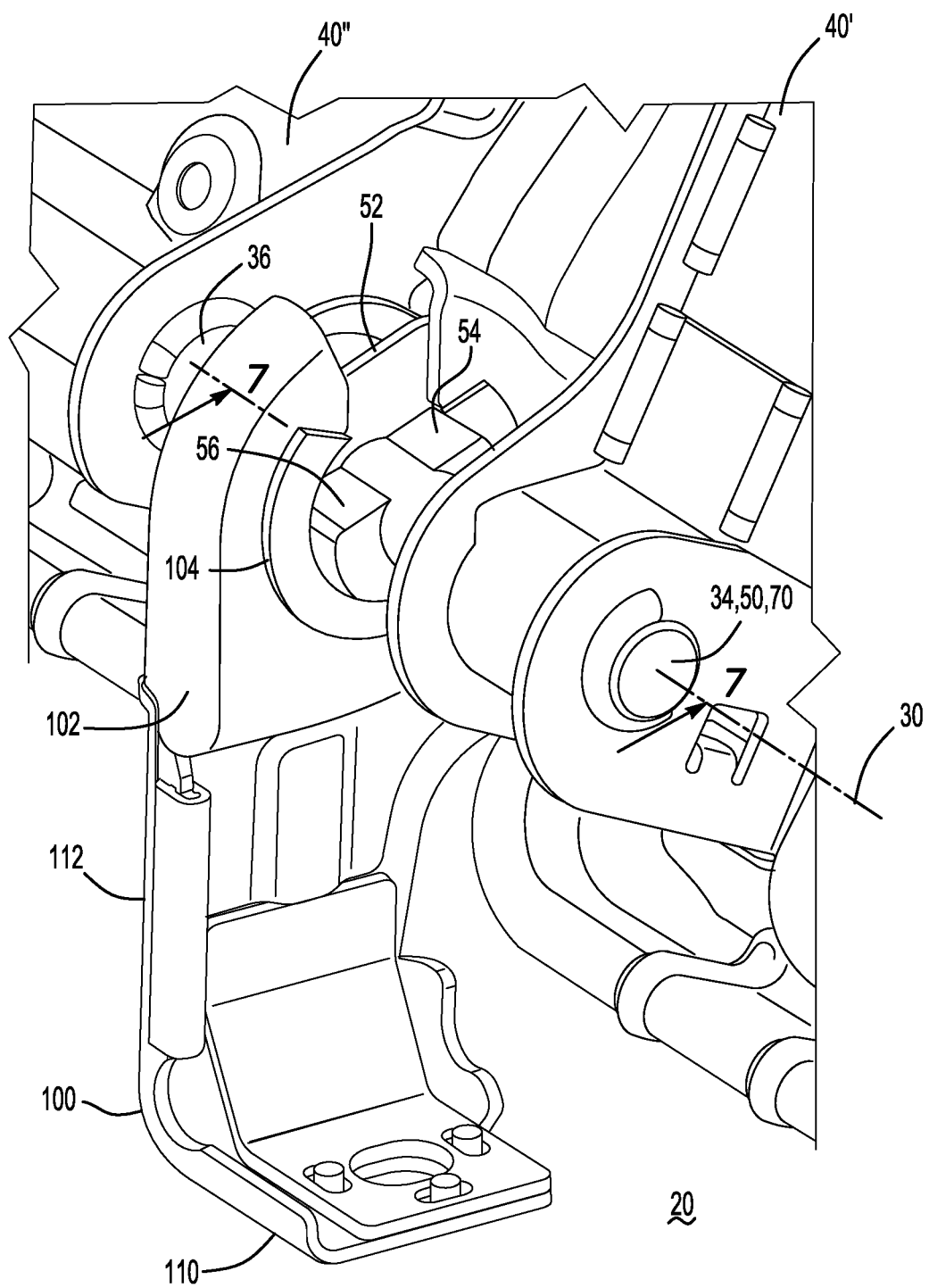
FIG. 3 is a perspective view showing a mounting bracket assembly that rotatably supports the seat back frame.
Figure 4:
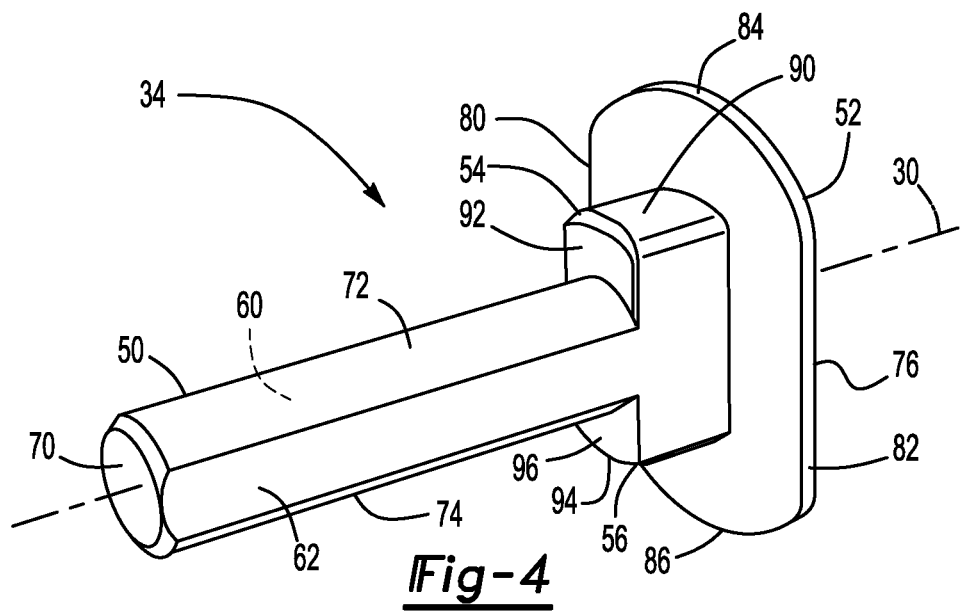
FIG. 4 is a perspective view of a pivot pin.

Referring to FIGS. 3 and 4, the shaft 50 may extend along the axis 30 and may be fixedly coupled to the seat back frame 32. The shaft 50 may define a first end surface 70 of the pivot pin 34. In at least one configuration, the shaft 50 may be cylindrical and the first flat surface 60, the second flat surface 62, or both, may be omitted from the shaft 50. Alternatively, the shaft 50 may be partially defined by the first flat surface 60 and the second flat surface 62. The shaft 50 may also include and may be partially defined by a first connecting surface 72 and a second connecting surface 74.

The first connecting surface 72 may extend from the first end surface 70 to the first protrusion 54. In addition, the first connecting surface 72 may extend from the first flat surface 60 to the second flat surface 62. For example, the first connecting surface 72 may have a nonplanar configuration that may extend along an arc, such as an arc that may be disposed at a constant radial distance from the axis 30. The first connecting surface 72 may be disposed further from the axis 30 than the first flat surface 60 and the second flat surface 62.

The second connecting surface 74 may be disposed opposite the first connecting surface 72. The second connecting surface 74 may extend from the first end surface 70 to the second protrusion 56. In addition, the second connecting surface 74 may extend from the first flat surface 60 to the second flat surface 62. For example, the second connecting surface 74 may have a nonplanar configuration that may extend along an arc, such as an arc that may be disposed at a constant radial distance from the axis 30. The second connecting surface 74 may be disposed further from the axis 30 than the first flat surface 60 and the second flat surface 62.

The enlarged head 52 may be disposed at an end of the pivot pin 34 and may define a second end surface 76 of the pivot pin 34. The second end surface 76 may be disposed opposite the first end surface 70. The second end surface 76 may be a substantially planar surface that may be disposed substantially parallel to the first end surface 70 in one or more embodiments. The enlarged head 52 may extend further from the axis 30 than the shaft 50, the first protrusion 54, and the second protrusion 56. In at least one configuration, the enlarged head 52 may have an outside perimeter that may include a first head flat surface 80, a second head flat surface 82, a first head connecting surface 84, and a second head connecting surface 86.

The first head flat surface 80 and the second head flat surface 82 may be disposed opposite each other and may be positioned further from the axis 30 than the shaft 50, the first protrusion 54, and the second protrusion 56. In at least one configuration, the first head flat surface 80 and the second head flat surface 82 may be substantially planar and may be disposed substantially parallel to each other. For example, the first head flat surface 80 may be disposed substantially parallel to the first flat surface 60 while the second head flat surface 82 may be disposed substantially parallel to the second flat surface 62. Accordingly, the first head flat surface 80 and the second head flat surface 82 may provide a visual indication or visual reference as to the orientation of the first protrusion 54 and the second protrusion 56 or the first flat surface 60 and the second flat surface 62 that may help a seat back installer rotate or position the seat back 14 and the pivot pin 34 in the proper orientation to permit assembly to a mounting bracket assembly 16 as will be discussed in more detail below.

The first head connecting surface 84 and the second head connecting surface 86 may be disposed opposite each other and may be positioned further from the axis 30 than the first head flat surface 80 and the second head flat surface 82. The first head connecting surface 84 and the second head connecting surface 86 may extend from the first head flat surface 80 to the second head flat surface 82. In at least one configuration, the first head connecting surface 84 and the second head connecting surface 86 may have a nonplanar configuration that may extend along an arc, such as an arc that may be disposed at a constant radial distance from the axis 30.

The first protrusion 54 and the second protrusion 56 may be axially positioned between the first end surface 70 and the second end surface 76 of the pivot pin 34. For example, the first protrusion 54 and the second protrusion 56 may extend in an axial direction or direction that extends along the axis 30 from the enlarged head 52 toward the first end surface 70. The first protrusion 54 and second protrusion 56 may extend further from the axis 30 than the shaft 50 and may be disposed closer to the axis 30 than the outside perimeter of the enlarged head 52. The first protrusion 54 and the second protrusion 56 may be configured as mirror images of each other and may be partially defined by the first flat surface 60 and the second flat surface 62. In addition, the first protrusion 54 may be partially defined by a first protrusion connecting surface 90 and a first protrusion step surface 92 while the second protrusion 56 may be partially defined by a second protrusion connecting surface 94 and a second protrusion step surface 96.

The first protrusion connecting surface 90 may extend from the first flat surface 60 to the second flat surface 62. The first protrusion connecting surface 90 may also extend axially from the enlarged head 52 to the first protrusion step surface 92. The first protrusion connecting surface 90 may be positioned further from the axis 30 than the first connecting surface 72 and may be disposed closer to the axis 30 than the first head connecting surface 84. In at least one configuration, the first protrusion connecting surface 90 may have a nonplanar configuration that may extend along an arc, such as an arc that may be disposed at a constant radial distance from the axis 30.

The first protrusion step surface 92 may be disposed at an end of the first protrusion 54 and may face away from the enlarged head 52. The first protrusion step surface 92 may extend away from the axis 30 and the shaft 50. For example, the first protrusion step surface 92 may extend from the first connecting surface 72 of the shaft 50 to the first protrusion connecting surface 90. In at least one configuration, the first protrusion step surface 92 may be disposed substantially perpendicular to the axis 30. The first protrusion step surface 92 may also extend from the first flat surface 60 to the second flat surface 62.

The second protrusion connecting surface 94 may be disposed opposite the first protrusion connecting surface 90. The second protrusion connecting surface 94 may extend from the first flat surface 60 to the second flat surface 62. The second protrusion connecting surface 94 may also extend axially from the enlarged head 52 to the second protrusion step surface 96. The second protrusion connecting surface 94 may be positioned further from the axis 30 than the second connecting surface 74 and may be disposed closer to the axis 30 than the second head connecting surface 86. In at least one configuration, the second protrusion connecting surface 94 may have a nonplanar configuration that may extend along an arc, such as an arc that may be disposed at a constant radial distance from the axis 30.

The first flat surface 60 may extend from the enlarged head 52 toward the first end surface 70. For instance, the first flat surface 60 may extend to the shaft 50 and/or to the first end surface 70. The first flat surface 60 may be planar or substantially planar and may at least partially define the shaft 50, the first protrusion 54, the second protrusion 56, or combinations thereof.

The second flat surface 62 may be disposed opposite the first flat surface 60 and may extend from the enlarged head 52 toward the first end surface 70. For instance, the second flat surface 62 may extend to the shaft 50 and/or to the first end surface 70. The second flat surface 62 may be disposed substantially parallel to the first flat surface 60. As such, the second flat surface 62 may be planar or substantially planar and may at least partially define the shaft 50, the first protrusion 54, the second protrusion 56, or combinations thereof.

Referring to FIG. 2, a secondary pin 36 may be fixed to the seat back frame 32. For example, a secondary pin 36 may be fixedly coupled to at least one portion of the seat back frame 32, such as portions 40, 40', and 40". A secondary pin 36 may extend along the axis 30 and may be rotatable about the axis 30. In the configuration shown, the secondary pin 36 that is provided with portions 40 and 40' may extend away from a corresponding pivot pin 34 and may be received in a corresponding end mounting bracket assembly 18. Two secondary pins 36 may be provided with portion 40" such that each secondary pin 36 may be rotatably mounted to a corresponding mounting bracket assembly 16.

Figure 7:
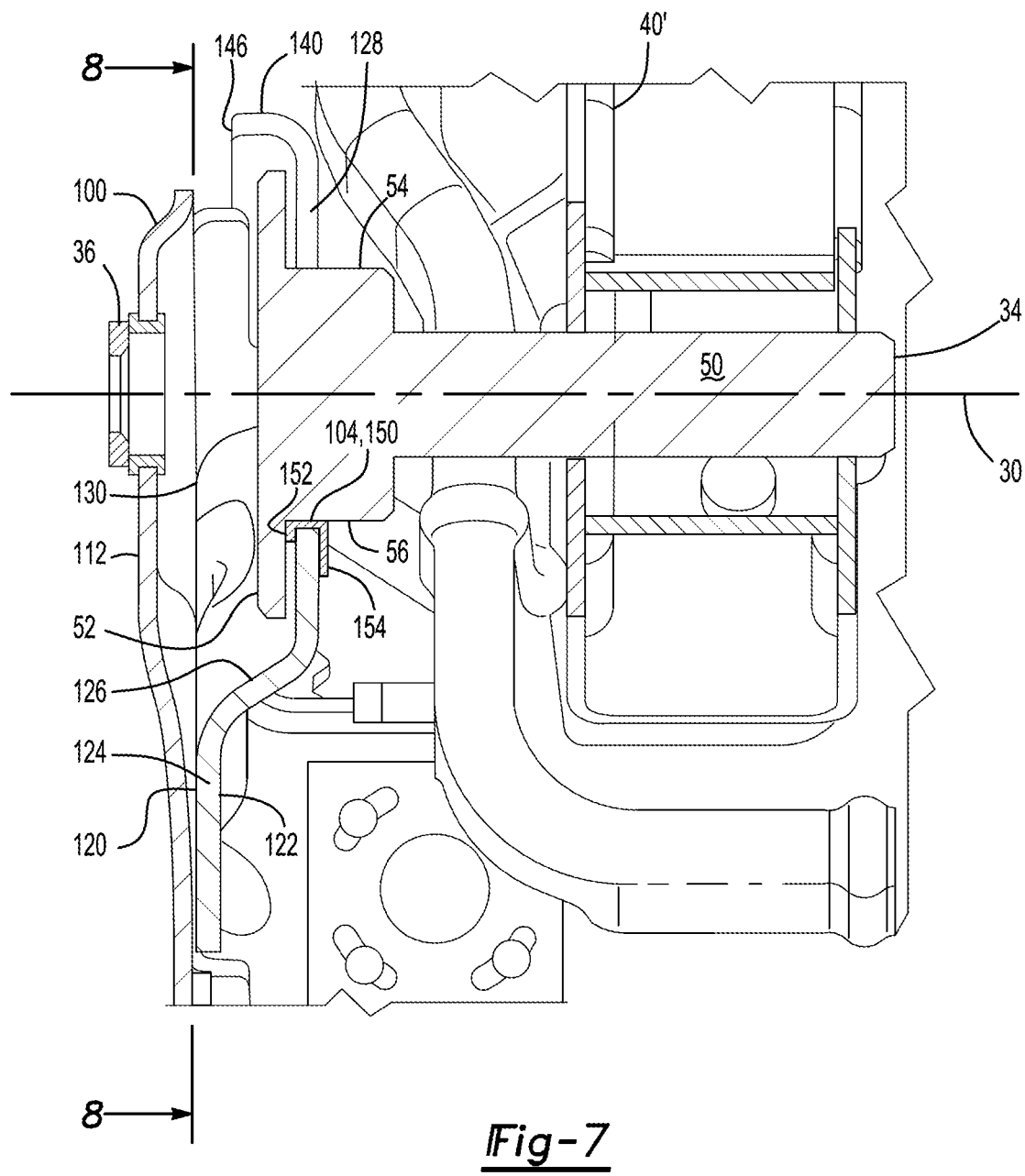
FIG. 7 is a section view along section line 7-7.

Referring to FIGS. 2, 3 and 7, at least one mounting bracket assembly 16 may rotatably support the seat back 14. In at least one configuration, the mounting bracket assembly 16 may include a base plate 100, a cover plate 102, and a bushing 104.

Referring primarily to FIGS. 3 and 7, the base plate 100 may be adapted to be mounted to the support structure 20 of the vehicle. The base plate 100 may receive and pivotally support a secondary pin 36 of a portion of the seat back 14 but may be spaced apart from the pivot pin 34. As such, the base plate 100 may receive and rotatably support a secondary pin 36 and a corresponding portion of the seat back frame 32, such as portion 40" but may not receive and rotatably support the pivot pin 34 and a corresponding portion of the seat back frame 32, such as portion 40 or 40'. The pivot pin 34 and the bushing 104 may be spaced apart from the base plate 100 as is best shown in FIG. 7. In at least one configuration, the base plate 100 may have a generally L-shaped configuration that may include at least one mounting flange 110 and an upright flange 112.

At least one mounting flange 110 may be disposed on the support structure 20 and may be coupled to the support structure 20 in any suitable manner, such as with one or more fasteners.

The upright flange 112 may extend upward from one or more mounting flanges 110. As is best shown in FIG. 7, the upright flange 112 may have an opening that may receive and rotatably support a secondary pin 36. In addition, the upright flange 112 may bend away from the cover plate 102 such that the upright flange 112 and the cover plate 102 may be spaced apart from each other near the axis 30.

The cover plate 102 may be fixedly mounted to the base plate 100. For example, the cover plate 102 may be fixedly mounted to the upright flange 112 of the base plate 100. The cover plate 102 may receive and may pivotally support the pivot pin 34 but may not receive and pivotally support a secondary pin 36, such as a secondary pin of the portion 40" of the seat back frame 32. As is best shown in FIG. 7, the enlarged head 52 of the pivot pin 34 may be received between the base plate 100 and the cover plate 102. In at least one configuration, the cover plate 102 may include a first side 120, a second side 122, a mounting panel 124, a connecting portion 126, and a receiving panel 128.

The first side 120 may face toward the upright flange 112 of the base plate 100. In addition, a portion of the first side 120 that is provided with the mounting panel 124 may contact the upright flange 112 of the base plate 100.

The second side 122 may be disposed opposite the first side 120. As such, the second side 122 of the cover plate 102 may be spaced apart from the base plate 100 and may face away from the upright flange 112.

The mounting panel 124 may be fixedly attached to the upright flange 112 of the base plate 100. In at least one configuration, the mounting panel 124 may be generally planar and may be mounted to the upright flange 112 of the base plate 100 along a mating plane 130.

The connecting portion 126 may extend upward from the mounting panel 124 to the receiving panel 128. For example, the connecting portion 126 may extend from an end of the mounting panel 124 to an end of the receiving panel 128. In addition, the connecting portion 126 may extend away from the mating plane 130. As such, the connecting portion 126 may extend away from the upright flange 112 of the base plate 100 such that the receiving panel 128 is disposed further from the mating plane 130 than the mounting panel 124, thereby helping to space apart the pivot pin 34 from the base plate 100.

The receiving panel 128 may extend upward from an end of the connecting portion 126. The receiving panel 128 may be configured to receive and rotatably support the pivot pin 34. In at least one configuration and as is best shown with reference to FIGS. 7 and 8, the receiving panel 128 may include an arcuate portion 140, a hole 142, and a slot 144.

The arcuate portion 140 may be disposed at an end of the cover plate 102 that may be disposed opposite the mounting panel 124. As is best shown in FIG. 7, the arcuate portion 140 may extend along an arc toward the mating plane 130. For instance, the arcuate portion 140 may extend along an arc to an end surface 146 that may face toward the mating plane 130. In addition, the arcuate portion 140 may be disposed above and may extend over the enlarged head 52 of the pivot pin 34. As is best shown in FIG. 8, the arcuate portion 140 may also extend along an arc with respect to the axis 30 and may be radially disposed with respect to the axis 30.

Figure 8:
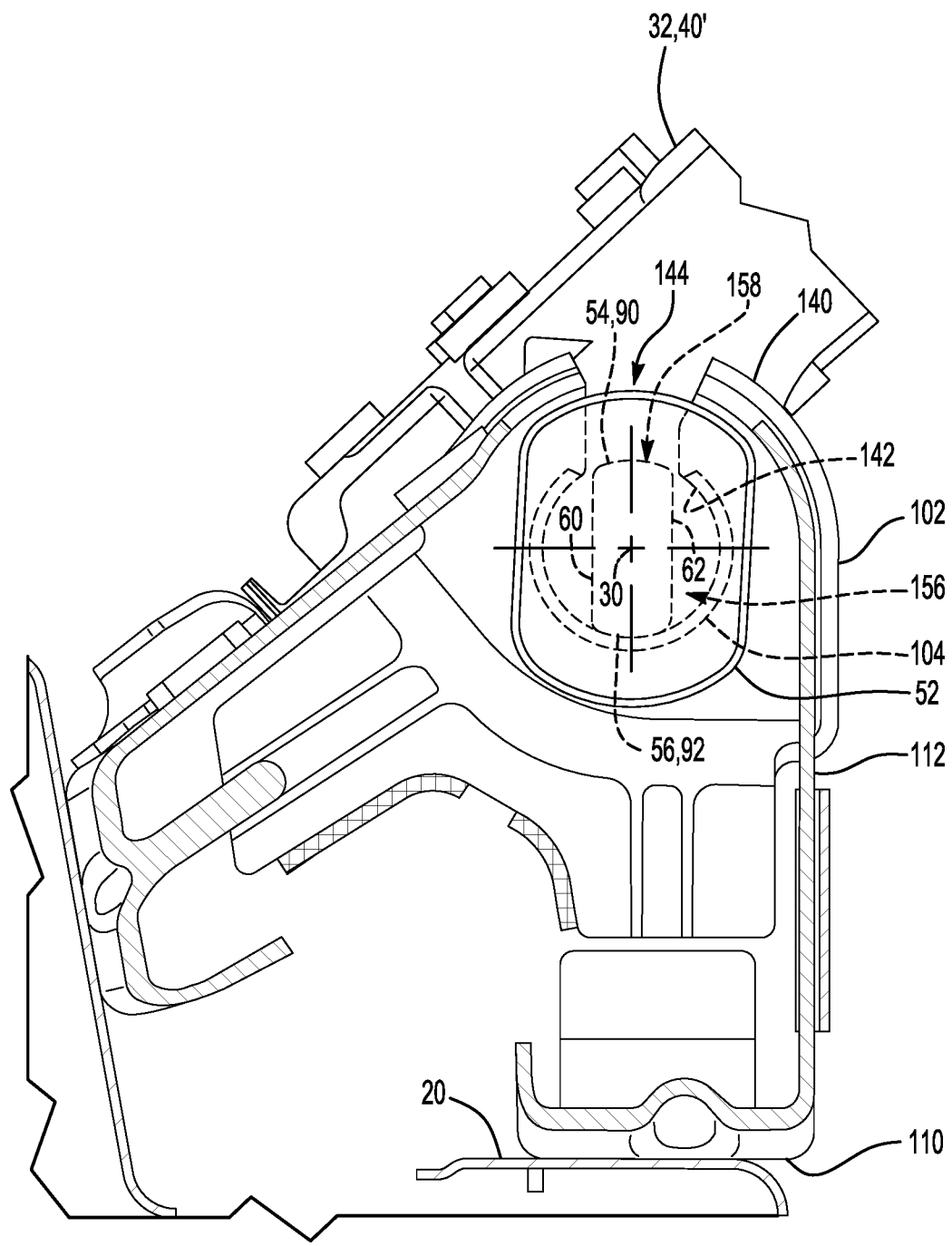
FIG. 8 is a section view along section line 8-8 showing the seat back in a mounting position.

Referring to FIG. 8, the hole 142 may be defined by the receiving panel 128 and may be disposed along the axis 30. The hole 142 may have a circular or substantially circular configuration and may be centered about the axis 30. The hole 142 may receive the bushing 104.

The slot 144 may extend from the hole 142 to a perimeter of the cover plate 102. For example, the slot 144 may extend upward from the hole 142 and may be defined by the receiving panel 128 and its arcuate portion 140. The pivot pin 34 may be inserted into the hole 142 or removed from the hole 142 via the slot 144.

Referring to FIGS. 3 and 8, the bushing 104 may be disposed in the hole 142 in the cover plate 102. The bushing 104 may be mounted to the cover plate 102 such that the bushing 104 may not rotate about the axis 30. The bushing 104 may be disposed between the pivot pin 34 and the cover plate 102 and may receive the pivot pin 34. As such, the pivot pin 34, and hence the seat back 14, may be rotatable with respect to the bushing 104. An example of a bushing 104 is shown in more detail in FIGS. 5 and 6. In at least one configuration, the bushing 104 may include a bearing wall 150, a first wall 152, and a second wall 154 and may define a bushing opening 156 and a bushing slot 158.

The bearing wall 150 may extend partially around the axis 30. As a nonlimiting example, the bearing wall 150 may extend between 230° and 330° around the axis 30. In at least one configuration, the bearing wall 150 may include a first end surface 160, a second end surface 162, an inner side 164, and an outer side 166.

The first end surface 160 may be disposed at a first distal end of the bearing wall 150. The first end surface 160 may extend from the inner side 164 to the outer side 166.

The second end surface 162 may be disposed at a second distal end of the bearing wall 150. As such, the second end surface 162 may be disposed at an opposite end of the bearing wall 150 from the first end surface 160. The second end surface 162 may be spaced apart from the first end surface 160 and may extend from the inner side 164 to the outer side 166.

The inner side 164 may face toward the axis 30 and may extend from the first end surface 160 to the second end surface 162. The inner side 164 may define the bushing opening 156. The bushing opening 156 may have an elliptical configuration and may receive the first protrusion 54 and the second protrusion 56 of the pivot pin 34 such that the pivot pin 34 may be rotatable about the axis 30 with respect to the bushing 104.

Figure 6:
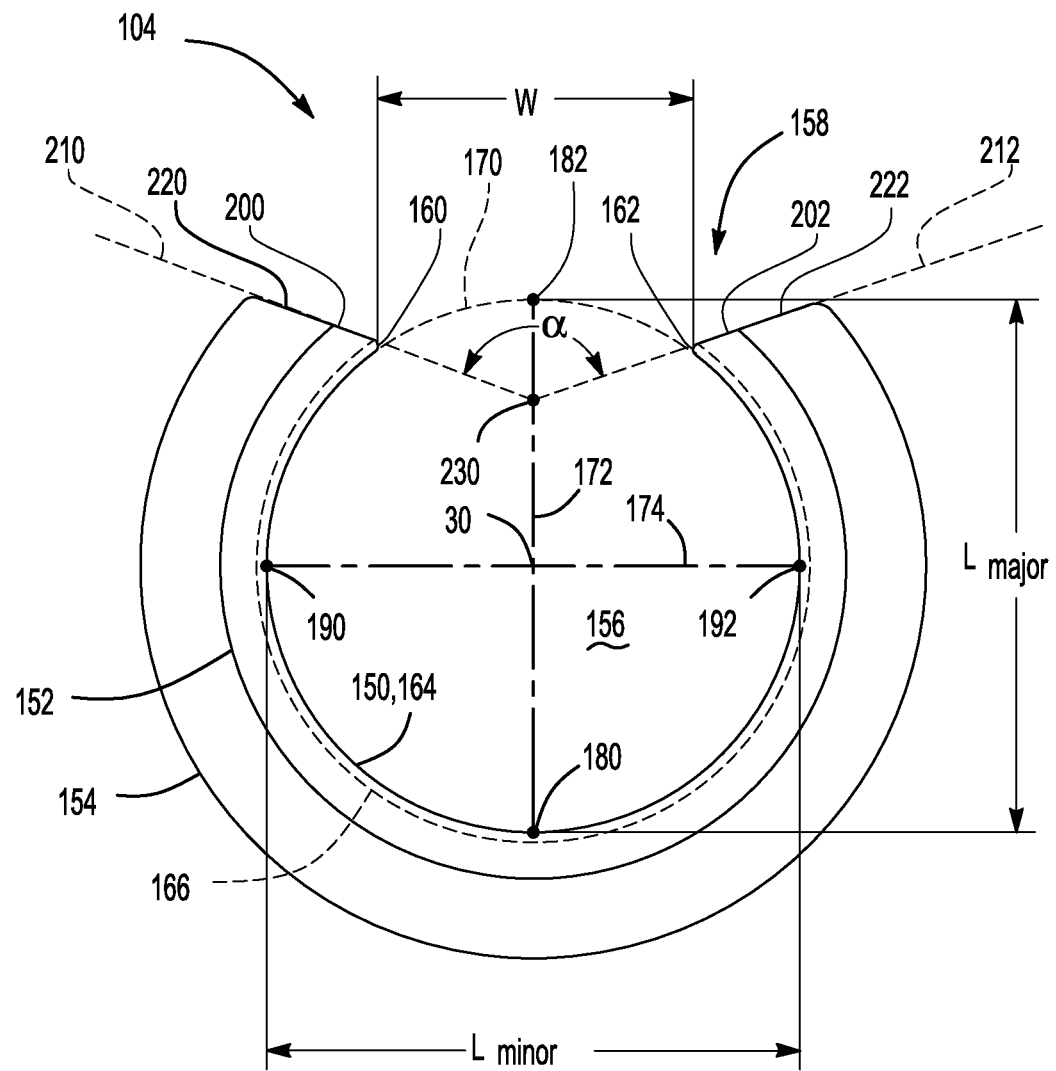
FIG. 6 is a side view of the elliptical bushing.

The elliptical configuration may be arranged along an ellipse 170. As is best shown in FIG. 6, the ellipse 170 may have a major axis 172 and a minor axis 174. The major axis 172 and the minor axis 174 may be linear axes that may be disposed perpendicular to each other and may intersect at the axis 30.

The major axis 172 may be disposed along the longest diameter or longest length of the ellipse 170. As an example, the major axis 172 may have a length $L_{major}$ of 27.0 mm. The bushing 104 may have mirror symmetry with respect to the major axis 172. As such, the major axis 172 may be equidistantly positioned from the first end surface 160 and the second end surface 162 of the bearing wall 150. The major axis 172 may have a first major axis endpoint 180 and a second major axis endpoint 182 that may be disposed at opposite ends of the major axis 172. The first major axis endpoint 180 and the second major axis endpoint 182 may be equidistantly spaced from the axis 30.

The first major axis endpoint 180 may intersect the inner side 164. In addition, the first major axis endpoint 180 may be equidistantly spaced from the endpoints of the minor axis 174.

The second major axis endpoint 182 may be spaced apart from the bearing wall 150 and may not intersect the inner side 164. As such, the major axis 172 may intersect the inner side 164 at only one endpoint. The second major axis endpoint 182 may be positioned in the bushing slot 158 and may be equidistantly spaced from the first end surface 160 and the second end surface 162 of the bushing 104.

The minor axis 174 may be disposed along the shortest diameter or shortest length of the ellipse 170. As an example, the minor axis 174 may have a length $L_{minor}$ of 26.2 mm. The bushing 104 may not have mirror symmetry with respect to the minor axis 174. The minor axis 174 may have a first minor axis endpoint 190 and a second minor axis endpoint 192 that may be disposed at opposite ends of the minor axis 174. The first minor axis endpoint 190 and the second minor axis endpoint 192 may be equidistantly spaced from the axis 30.

The first minor axis endpoint 190 may intersect the inner side 164. The first minor axis endpoint 190 may be disposed closer to the first end surface 160 than to the first major axis endpoint 180.

The second minor axis endpoint 192 may also intersect the inner side 164. The second minor axis endpoint 192 may be disposed closer to the second end surface 162 than to the first major axis endpoint 180.

Figure 5:
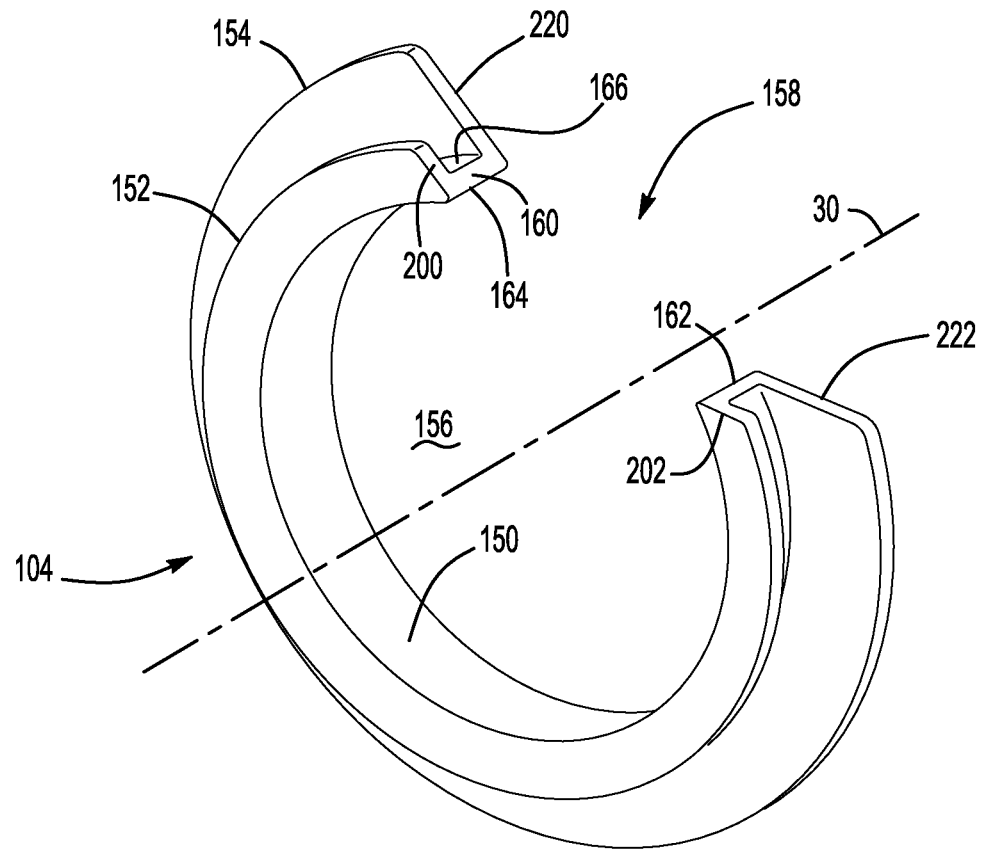
FIG. 5 is a perspective view of an elliptical bushing.

Referring to FIGS. 5 and 6, the outer side 166 may be disposed opposite the inner side 164. As such, the outer side 166 may face away from the axis 30. The outer side 166 may extend from the first end surface 160 to the second end surface 162. The outer side 166 may also extend from the first wall 152 to the second wall 154 and may engage or contact the receiving panel 128 of the cover plate 102 of the mounting bracket assembly 16. In at least one configuration, the outer side 166 may be disposed at a substantially constant radial distance from the axis 30. In such a configuration, the outer side 166 may have a circular cross-section while the inner side 164 may have an elliptical configuration and may not be disposed parallel to the outer side 166.

Referring to FIGS. 5 and 6, the first wall 152 may extend from the bearing wall 150. For example, the first wall 152 may extend from a first end or first edge of the bearing wall 150 in a direction that extends away from the axis 30. As is best shown in FIG. 5, the first wall 152 may be spaced apart from the second wall 154. In addition, the first wall 152 may be disposed substantially parallel to the second wall 154 in one or more configurations. As is best shown in FIG. 7, the first wall 152 may be disposed on or against the first side 120 of the receiving panel 128 of the cover plate 102 and may be positioned between and may contact the enlarged head 52 of the pivot pin 34 and the cover plate 102. As such, the first wall 152 may help separate the enlarged head 52 from the receiving panel 128 and may inhibit axial movement of the pivot pin 34 toward the receiving panel 128, or axial movement to the right from the perspective shown in FIG. 7.

Referring to FIGS. 5 and 6, the first wall 152 may have a first wall first end surface 200 and a first wall second end surface 202.

The first wall first end surface 200 may be disposed at a first distal end of the first wall 152. The first wall first end surface 200 may extend from the first end surface 160 of the bearing wall 150 and may be coplanar with the first end surface 160 of the bearing wall 150. For example, the first end surface 160 and the first wall first end surface 200 may be disposed in a first end plane 210 as is best shown in FIG. 6.

The first wall second end surface 202 may be disposed at a second distal end of the first wall 152. As such, the first wall second end surface 202 may be disposed at an opposite end of the first wall 152 from the first wall first end surface 200. The first wall second end surface 202 may extend from the second end surface 162 of the bearing wall 150 and may be coplanar with the second end surface 162 of the bearing wall 150. For example, the second end surface 162 and the first wall second end surface 202 may be disposed in a second end plane 212 as is best shown in FIG. 6.

Referring to FIGS. 5 and 6, the second wall 154 may extend from the bearing wall 150. For example, the second wall 154 may extend from a second end or second edge of the bearing wall 150 that may be disposed opposite the first wall 152 in a direction that extends away from the axis 30. As is best shown in FIG. 5, the second wall 154 may extend further from the axis 30 than the first wall 152. As is best shown in FIG. 7, the second wall 154 may be disposed on or against the second side 122 of the receiving panel 128 of the cover plate 102. As such, the first wall 152 and the second wall 154 may cooperate to receive the receiving panel 128 and may inhibit axial movement of the bushing 104 with respect to the cover plate 102.

Referring to FIGS. 5 and 6, the second wall 154 may have a second wall first end surface 220 and a second wall second end surface 222.

The second wall first end surface 220 may be disposed at a first distal end of the second wall 154. The second wall first end surface 220 may extend from the first end surface 160 of the bearing wall 150 and may be coplanar with the first end surface 160. For example, the second wall first end surface 220 may be disposed in the first end plane 210 as is best shown in FIG. 6.

The second wall second end surface 222 may be disposed at a second distal end of the second wall 154. As such, the second wall second end surface 222 may be disposed at an opposite end of the second wall 154 from the second wall first end surface 220. The second wall second end surface 222 may extend from the second end surface 162 of the bearing wall 150 and may be coplanar with the second end surface 162. For example, the second wall second end surface 222 may be disposed in the second end plane 212 as is best shown in FIG. 6.

Referring to FIG. 6, the first end plane 210 and the second end plane 212 may be disposed in a nonparallel and non-perpendicular relationship. For example, the first end plane 210 and the second end plane 212 may be disposed at an obtuse angle α with respect to each other. As a nonlimiting example, the obtuse angle may be greater than 120° and less than 180°. The first end plane 210 and the second end plane 212 may intersect the major axis 172 at an end plane intersection point 230. The end plane intersection point 230 may be disposed closer to the second major axis endpoint 182 than to the first major axis endpoint 180. The end plane intersection point 230 may also be disposed closer to the second major axis endpoint 182 than to the axis 30. Optionally, the end plane intersection point 230 may be disposed closer to the first end surface 160 and the second end surface 162 of the bearing wall 150 than to the axis 30.

The bushing slot 158 may be disposed between the first end surface 160 and the second end surface 162. The bushing slot 158 may have a width W that may be less than the length of the minor axis 174. For example, as is best shown in FIG. 6, width W from the first end surface 160 of the bearing wall 150 to the second end surface 162 of the bearing wall 150 may be greater than a distance from the first major axis endpoint 180 to the axis 30.

Referring to FIG. 2, a least one end mounting bracket assembly 18 may facilitate pivoting of a portion of the seat back 14 about the axis 30. For example, an end mounting bracket assembly 18 may pivotally support the left portion 40 and the right portion 40' of the seat back 14. Each end mounting bracket assembly 18 may be fixedly positioned on the support structure 20. For example, the end mounting bracket assembly 18 may be attached to the support structure 20 with one or more fasteners such as bolts in a manner that inhibits or prevents axial movement of the seat back frame 32 or a portion thereof.

Figure 9:
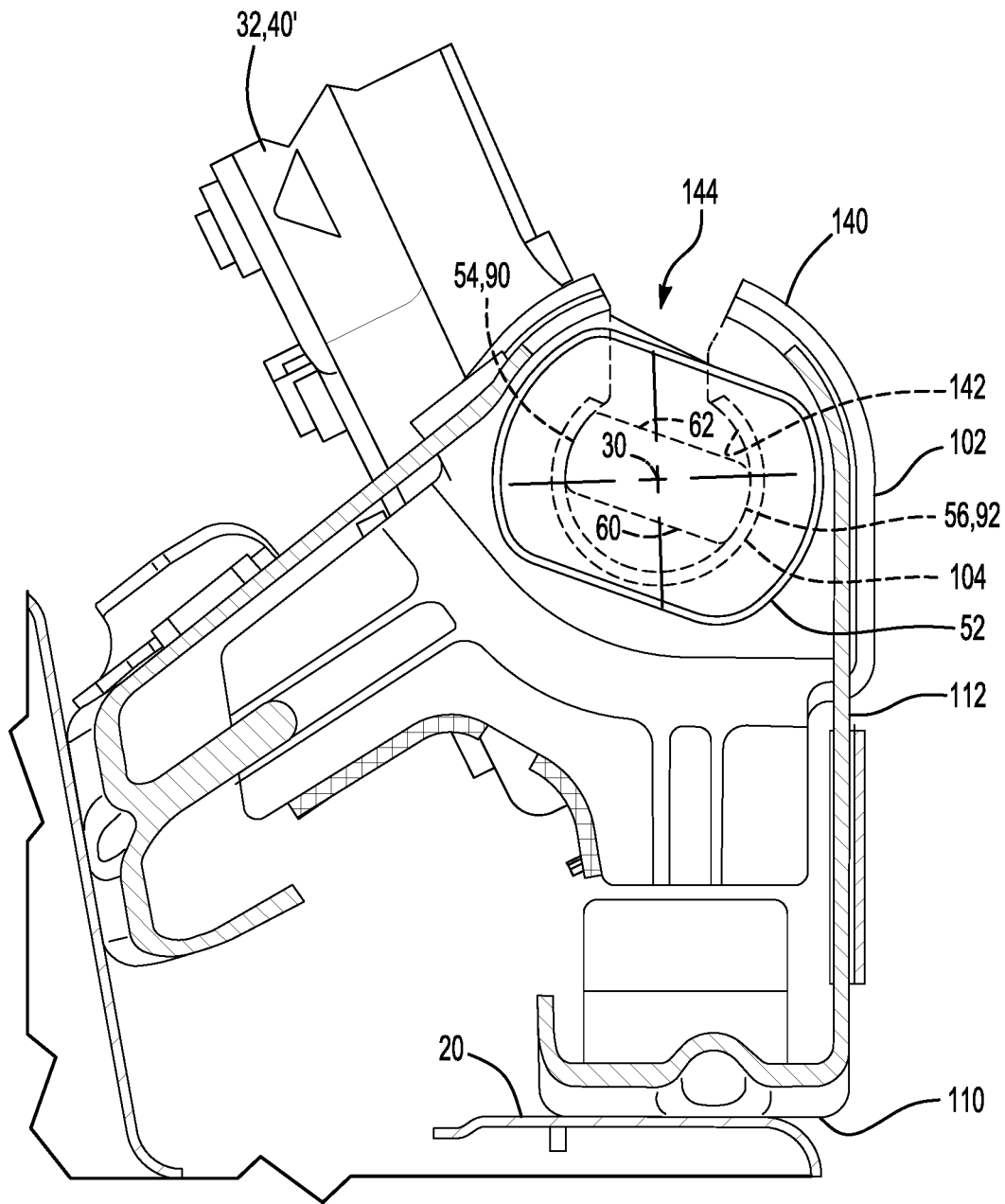
FIG. 9 is a section view along section line 8-8 showing the seat back in a first position.
Figure 10:
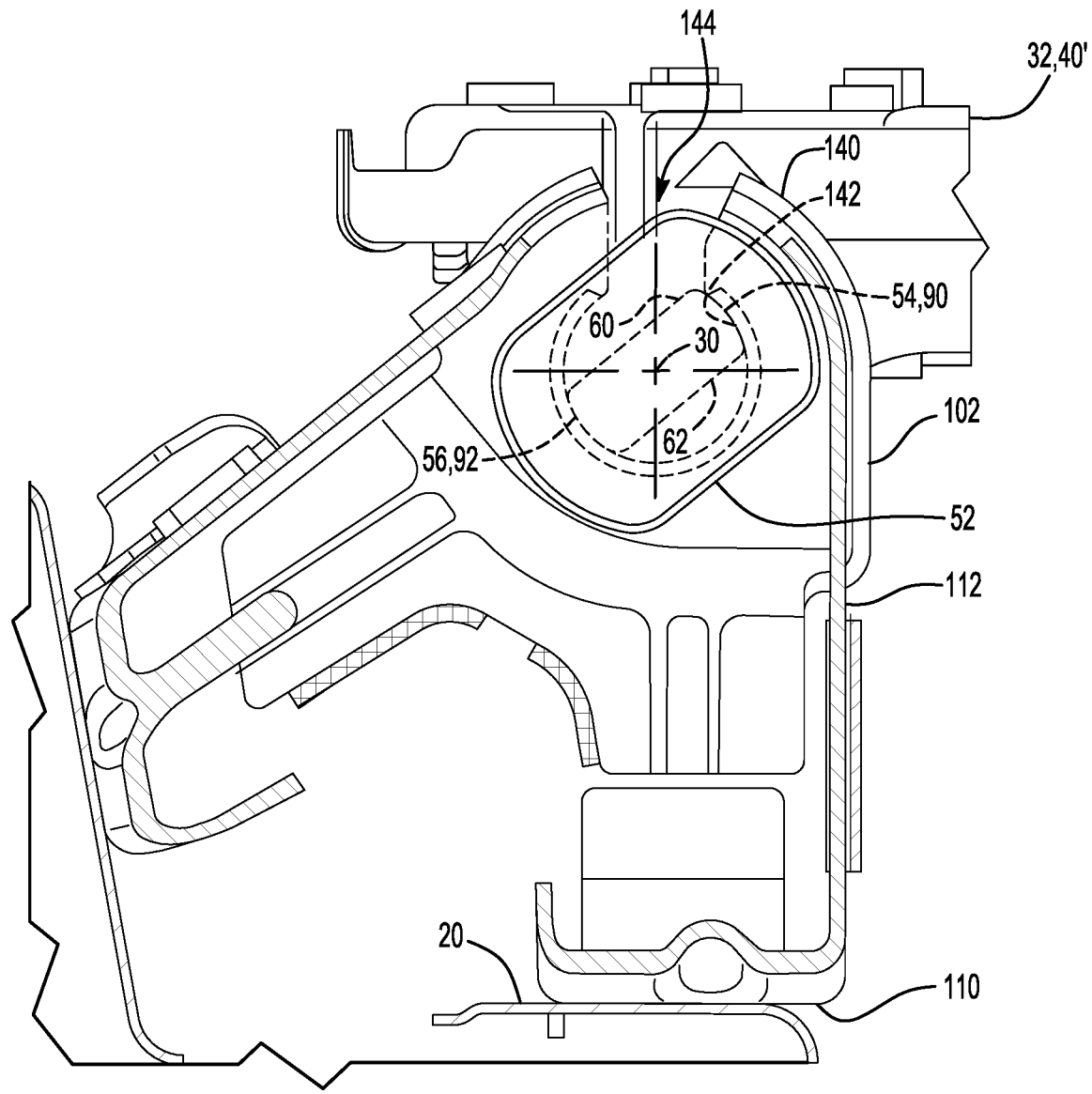
FIG. 10 is a section view along section line 8-8 showing the seat back in a second position.

Referring to FIGS. 8-10, the seat back frame 32 is shown in various rotational positions with respect to a mounting bracket assembly 16.

Referring to FIG. 8, the seat back frame 32 is shown in a mounting position. The pivot pin 34 may be mounted to the mounting bracket assembly 16 or removed from the mounting bracket assembly 16 when the seat back frame 32 is in the mounting position. The pivot pin 34 may be insertable into the bushing opening 156 via the slot 144 and the cover plate 102 and the bushing slot 158 when the first flat surface 60 and the second flat surface 62 of the pivot pin 34 are aligned with the slot 144 and the bushing slot 158. For example, the pivot pin 34 may be insertable into the bushing opening 156 via the slot 144 and the bushing slot 158 when the first flat surface 60 and the second flat surface 62 are oriented substantially parallel to the major axis 172 of the elliptical opening of the bushing 104 and/or positioned such that the first flat surface 60 and the second flat surface 62 may fit through the slot 144 and the bushing slot 158. In at least one configuration, the pivot pin 34 may be insertable into the bushing opening 156 or removable from the bushing opening 156 via the slot 144 and the bushing slot 158 when the seat back frame 32 or a portion thereof is decoupled from an associated end mounting bracket assembly 18 and first flat surface 60 and the second flat surface 62 are disposed in a substantially vertical orientation. The pivot pin 34 may be inserted by positioning the enlarged head 52 axially such that the enlarged head 52 may fit between the base plate 100 and the cover plate 102 of the mounting bracket assembly 16 and then inserting the pivot pin 34 through the slot 144, the bushing slot 158, and into the bushing opening 156. The pivot pin 34 and associated portion of the seat back frame 32 may then be moved axially toward the cover plate 102 and to the position shown in FIG. 7 and then further secured by attaching the end mounting bracket assembly 18. The enlarged head 52 may be spaced apart from the base plate 100 and the cover plate 102 when the first protrusion 54 and the second protrusion 56 are received in the bushing opening 156.

Referring to FIG. 9, the seat back frame 32 is shown in a first position. The first position may correspond to the generally upright seating position shown in FIGS. 1 and 2. In the first position, the seat back frame 32 and its pivot pin 34 are rotated counterclockwise about the axis 30 with respect to the mounting position from the perspective shown. As such, the first protrusion connecting surface 90 and the second protrusion connecting surface 94 may rotate toward the minor axis 174 as compared to the mounting position.

Referring to FIG. 10, the seat back frame 32 is shown in a second position. The second position may correspond to the folded position in which at least a portion of the seat back 14 may be folded over the top of the seat bottom 12. In the second position, the seat back frame 32 and its pivot pin 34 are rotated clockwise about the axis 30 with respect to the mounting position from the perspective shown. As such, the first protrusion connecting surface 90 and the second protrusion connecting surface 94 may rotate toward the minor axis 174 as compared to the mounting position.

The elliptical configuration of the bushing opening 156 may help keep the pivot pin 34 in the bushing opening 156 and may facilitate smooth rotational movement of the pivot pin 34 about the axis 30, such as when the seat back frame 32 is rotated from the first position toward the second position or vice versa. For example, aligning the major axis 172 of the elliptical opening with the bushing opening 156 may provide a small amount of clearance or free play that may inhibit or prevent the first protrusion 54 from catching on the first end surface 160 of the bushing 104 when the pivot pin 34 is rotated from the mounting position or the second position toward the first position and may inhibit the first protrusion 54 from catching on the second end surface 162 of the bushing 104 when the pivot pin 34 is rotated from the mounting position or the first position toward the second position. As such, the first protrusion connecting surface 90 of the first protrusion 54 may be spaced apart from and may not catch on the ends or edges of the bearing wall 150 where the inner side 164 intersects the first end surface 160 or the second end surface 162 and thus the pivot pin 34 may not be inhibited from rotating by the bushing 104. The radial length of the pivot pin 34 at the protrusions or from the first protrusion connecting surface 90 to the second protrusion connecting surface 94 may be the same or substantially the same as the length $L_{minor}$ of the minor axis 174 from the first minor axis endpoint 190 to the second minor axis endpoint 192. As such, free play between the bearing wall 150 and the first protrusion 54 and the second protrusion 56 may decrease as the protrusions are rotated toward the minor axis 174 such that no free play or substantially no free play may be provided along the minor axis 174. Thus, the elliptical configuration of the bushing 104 may inhibit fore/aft or forward/backward movement of the pivot pin 34 and the seat back frame 32 when the seat back is in the first position or the second position as compared to the mounting position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bushing comprising:
   a bearing wall that extends partially around an axis, wherein the bearing wall includes:
   a first end surface;
   a second end surface that is disposed opposite the first end surface and is spaced apart from the first end surface;
   an inner side that faces toward the axis and extends from the first end surface to the second end surface, wherein the inner side defines a bushing opening having an elliptical configuration;
   a first wall that extends away from the axis and extends from the bearing wall;
   a second wall that extends away from the axis and extends from the bearing wall, the first wall is spaced apart from the second wall and the second wall extends further from the axis than the first wall.

2. The bushing of claim 1, wherein the elliptical configuration is arranged along an ellipse that has a minor axis and a major axis that are disposed perpendicular to the axis, wherein the minor axis is disposed perpendicular to the major axis and is disposed along a shortest diameter of the ellipse, the major axis is disposed along a longest diameter of the ellipse, and the major axis intersects the inner side at only one endpoint.

3. The bushing of claim 2, wherein the minor axis has a first minor axis endpoint and a second minor axis endpoint that are disposed at opposite ends of the minor axis, wherein the first minor axis endpoint and the second minor axis endpoint intersect the inner side.

4. The bushing of claim 3, wherein the bushing does not have mirror symmetry with respect to the minor axis.

5. The bushing of claim 3, wherein the major axis has a first major axis endpoint and a second major axis endpoint that are disposed at opposite ends of the major axis, wherein the first major axis endpoint is the one endpoint that intersects the inner side and the second major axis endpoint does not intersect the inner side.

6. The bushing of claim 5, wherein the bushing has mirror symmetry with respect to the major axis.

7. The bushing of claim 5, wherein the second major axis endpoint is equidistantly spaced from the first end surface and the second end surface.

8. The bushing of claim 5, wherein the first minor axis endpoint is disposed closer to the first end surface than to the first major axis endpoint and the second minor axis endpoint is disposed closer to the second end surface than to the first major axis endpoint.

9. The bushing of claim 5, wherein a distance from the first end surface to the second end surface is greater than a distance from the first major axis endpoint to the axis.

10. A bushing comprising:
    a bearing wall that extends partially around an axis, wherein the bearing wall includes:
    a first end surface;
    a second end surface that is disposed opposite the first end surface and is spaced apart from the first end surface;
    an inner side that faces toward the axis and extends from the first end surface to the second end surface, wherein the inner side defines a bushing opening having an elliptical configuration;
    an outer side that is disposed opposite the inner side;
    a first wall that extends away from the axis and extends from the bearing wall;
    a second wall that extends away from the axis and extends from the bearing wall, the first wall is spaced apart from the second wall and wherein the second wall extends further from the axis than the first wall.

11. The bushing of claim 10, wherein the outer side is disposed at a substantially constant radial distance from the axis.

12. The bushing of claim 10, wherein the first wall is spaced apart from the second wall and the outer side extends from the first wall to the second wall.

13. The bushing of claim 12, wherein the first wall is disposed substantially parallel to the second wall.

14. The bushing of claim 10, wherein the first wall extends from a first edge of the bearing wall and the second wall extends from a second edge of the bearing wall that is disposed opposite the first edge.

15. The bushing of claim 10, wherein the first wall has a first wall first end surface, the second wall has a second wall first end surface, and the first end surface, the first wall first end surface, and the second wall first end surface are coplanar and disposed in a first end plane.

16. The bushing of claim 15, wherein the first wall has a first wall second end surface disposed opposite the first wall first end surface, the second wall has a second wall second end surface that is disposed opposite the second wall first end surface, and the second end surface, the first wall second end surface, and the second wall second end surface are coplanar and disposed in a second end plane.

17. The bushing of claim 16, wherein the first end plane and the second end plane are disposed at an obtuse angle with respect to each other.

18. The bushing of claim 17, wherein the elliptical configuration is arranged along an ellipse that includes:
    a major axis that is disposed perpendicular to the axis and is disposed along a longest diameter of the ellipse, wherein the major axis has a first major axis endpoint that intersects the inner side and a second major axis endpoint that is disposed at an opposite end of the major axis from the first major axis endpoint such that the second major axis endpoint does not intersect the bushing; and a minor axis that is disposed perpendicular to the axis and the major axis and is disposed along a shortest diameter of the ellipse, wherein the first end plane and the second end plane intersect the major axis at an end plane intersection point.

19. The bushing of claim 18, wherein the end plane intersection point is disposed closer to the second major axis endpoint than the first major axis endpoint.

20. The bushing of claim 10, wherein the bushing opening is configured to receive a pivot pin such that the pivot pin is rotatable about the axis with respect to the bushing.

\* \* \* \* \*